United States Patent [19]

Wada et al.

[11] 4,299,855
[45] Nov. 10, 1981

[54] METHOD OF PRODUCING A CHEESE PRODUCT IN SNACK-SIZED FORM

[75] Inventors: Takanori Wada, Machida; Hitoshi Sano, Sayama; Shigekatsu Sato; Yukihiro Saiki, both of Hidaka; Keisuke Shimizu, Arajuka; Masanori Hirata, Tachikawa; Junichi Naka, Matsudo; Takayoshi Takahashi, Machida; Toshiaki Ishii; Toshikazu Kamiki, both of Higashimurayama, all of Japan

[73] Assignee: Snow Brand Milk Products Co. Ltd., Sapporo, Japan

[21] Appl. No.: 125,836

[22] Filed: Feb. 29, 1980

[30] Foreign Application Priority Data

Mar. 20, 1979 [JP] Japan .................................. 54-31753

[51] Int. Cl.$^3$ ............................................. A23C 19/00
[52] U.S. Cl. .................................... 426/512; 426/518; 426/582
[58] Field of Search ............... 426/512, 516, 518, 582, 426/36

[56] References Cited

U.S. PATENT DOCUMENTS 3,008,235 11/1961 Royer et al. ......................... 426/512
3,761,284 9/1973 Foster et al. ......................... 426/518
3,966,970 6/1976 Williams ............................... 426/516

*Primary Examiner*—Joseph M. Golian
*Assistant Examiner*—George C. Yeung

[57] ABSTRACT

A method of producing a cheese product in snack-sized form comprising the steps of cooling a molten cheese to a temperature of about 45° C. to 35° C., heating a surface area extending in the radial direction from the surface of the cheese to a thickness of ⅛ to 1/6 of the cheese diameter of the cooled cheese to a temperature of about 52° C. to 39° C., cutting the heated cheese into snack sized pieces by rolling within a mold die for rounding the pieces of cheese, and forming each of the snack sized pieces into a rounded shape without corners, thereby providing a snack sized cheese product formed into a desirable rounded shape such as spherical, ellipsoidal, and barrel shape and having good appearance without creases and cracks on the surface thereof as well as a homogeneous texture.

2 Claims, 1 Drawing Figure

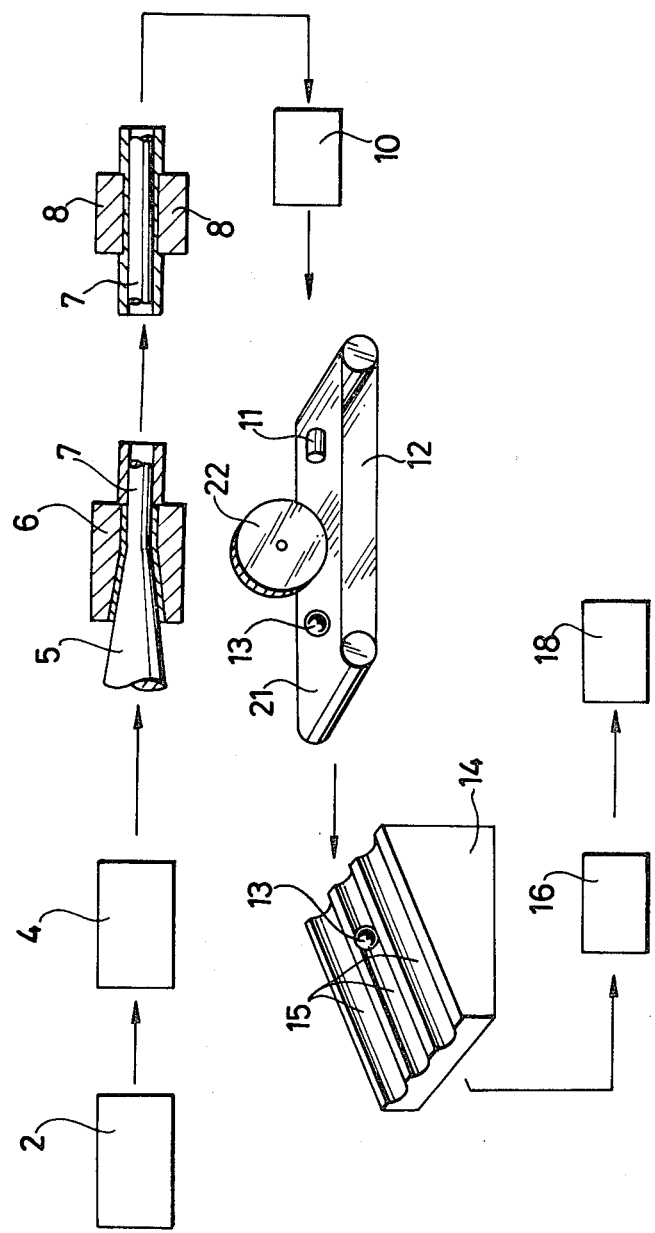

METHOD OF PRODUCING A CHEESE PRODUCT IN SNACK-SIZED FORM

BACKGROUND OF THE INVENTION

The present invention relates to a method of producing a cheese product in snack-sized form, more particularly, to a method of producing snack-sized pieces of a cheese product, formed into a desirable rounded shape such as a sphere and having a good appearance and a uniform texture.

Recently, several productions methods of snack-sized cheese products have been proposed so as to satisfy the needs of the consumer or provide cheese products consumable in a few bites. For example, such production methods are disclosed in U.S. Pat. No. 3,761,284 and U.S. Pat. No. 3,966,970 (corresponding to Japanese Patent Publication laid-open to the public under No. 155384 and claiming the convention priority thereof). The primary object of these prior arts is to provide snack-sized cheese products having a cylindrical shape. In the U.S. Pat. No. 3,761,284, a molten cheese is cooled to a temperature varying about 20° to 30° C. and formed into a rope and then cut into a desired length to obtain snack-sized pieces. Thereafter, each piece is quickly cooled and wrapped. The U.S. Pat. No. 3,966,970 discloses a high-speed cutting of a quickly cooled cheese rope into individual pieces and a twist-wrapping thereof for improving the efficiency in manufacturing the snack-sized cheese products.

Although these prior arts permit the provision of bite-sized pieces of a cheese product convenient to the consumer, the resultant shape of the product is inevitably limited to the shape obtained by the step of cutting the rope. Accordingly, the possible variations in the shape of the product according to the conventional arts are restricted to the varieties obtained by changing the sectional shape of the rope.

Recent increased consumption of snack-sized cheese products resulting from its convenience to the consumer indicates the possibility of expanding the market by the provision of more varieties of products on the basis of the improvement of the appearance, shape, and quality of the snack sized cheese products.

Conventional methods do not relate to the formation process of the cheese products, subsequent to the cutting process, causing the cheese mass to be formed into a desired shape. Therefore, the resultant individual piece of cheese obtained by cooling and cutting in accordance with conventional methods is too hard to be formed into a desirable shape. Moreover, such cheese products having an unfavorable hardness for shaping has a disadvantage of producing creases, cracks, and small voids on the surface of the cheese and other portions thereof. As a result, the cheese products manufactured by the conventional arts often produce a defective appearance, providing a poor product value in the market.

Another conventional method called the "hot-pack method", wherein a molten cheese is solidified within a mold die to obtain cheese products having a desired shape cannot be considered as being a continuous, effective manufacturing method capable of offering high quality, snack sized cheese products in an effective manner.

BRIEF SUMMARY OF THE INVENTION

An object of the present invention is to provide a forming method of cheese products capable of providing snack sized cheese products having a good appearance and a uniform texture and being formed, as a whole, into a desirable rounded shape such as a sphere, ellipsoid, and/or a barrel shape.

In accordance with the primary features of the present invention, there is provided a method of producing cheese products in snack-sized form comprising the steps of: cooling a molten cheese to a temperature range of about 45° C. to 35° C.; heating a surface area of the cooled cheese to a temperature of about 52° C. to 39° C.; cutting the heated cheese into snack-sized pieces of cheese; and forming each of the snack-sized pieces by continuous rolling within a mold die for forming into a rounded shape without corners.

According to the present invention, the snack-sized cheese product formed into a desirable rounded shape such as spherical, ellipsoidal and/or barrel shape and having good appearance without creases and cracks on the surface thereof as well as a homogeneous texture can be obtained.

BRIEF DESCRIPTION OF THE DRAWING

The single FIGURE is a schematic illustration showing a method of producing a cheese product in snack-sized form for embodying the present invention.

DETAILED DESCRIPTION OF THE INVENTION

In general, the physical properties of a cheese depend on various factors. The formability and self-shape-sustaining characteristic, which are the primary factors regarding the present invention, relate to the temperature, moisture content and degree of maturation of the cheese. Moreover, in case of a processed cheese, both factors can change in response to the cheese composition, emulsification condition and the like.

In order to successively form the snack-sized pieces of the cheese product into desirable rounded shapes, the present inventors studied the relationship between the temperature, formability and self-shape-sustaining characteristic of the cheese and found the fact that cheese can be suitably formed into a desired shape by controlling the temperature of the cheese, more accurately, the temperature distribution within the cheese.

The term "formability" is intended to mean the workability of the cheese in the forming process thereof. The term "self-shape-sustaining characteristic" is primarily intended to mean the ability of the formed cheese itself to maintain the shape thereof, i.e., the ability of resisting against the deformation due to the dead load thereof as well as external forces applied to the cheese during the production process and the transporting operation required therein.

Accordingly, both of the terms "formability" and "self-shape-sustaining characteristic" concern the physical properties relating to the forming step in the cheese production and are intended to distinguish conventional arts in the field without the forming step.

As a whole, the formability and the self-shape-sustaining characteristic conflict with each other. When considering the temperature characteristic thereof, the suitable temperature range regarding the formability differs from that of the sustaining characteristic. As mentioned above, the respective suitable temperature ranges depend on the several factors such as the temperature, moisture content and degree of the maturation of the cheese. In addition to these natures, a small thermal conductivity of the cheese or the uncontrollability of the cheese temperature causes the formation of the cheese and the maintenance of the shape of the formed cheese to be difficult.

According to the present invention, the determination of the suitable temperature zone of about 45° C. to 35° C. i.e., the temperature zone in which any deformation in the shape of the cheese does not occur with the passage of time is carried out by considering the above-mentioned features in the cheese production so that the determination is responsive to the natures of the cheese to be formed. The present inventors conducted a number of experiments and found the fact that the suitable temperature zone varies from about 35° C. to 45° C. Such a finding is obtained on the basis of the consideration as to the dependence of the temperature zone upon the moisture content of the cheese to be formed. In the determining of a suitable temperature, it is required to consider the occurrence of the shift of the temperature in response to the variations in other factors such as the kind of the cheese to be formed, even if the moisture content of the cheese used for the production remains unchanged.

The present inventors found the necessity of cooling the cheese below about 45° C. to 35° C. in case of processed cheese having a moisture content of about 45% to 50%, respectively. In the present invention, the molten cheese is cooled to an appropriate temperature varying from about 45° C. to 35° C. in a scraped double tube type heat exchange device so as to conform to the variation in the moisture content of the molten cheese ranging from about 40% to 50%.

Accordingly, the molten cheese is cooled to a temperature of about 45° C. to 35° C. The reasons of terminating the cooling of the cheese at a temperature of about 45° C. to 35° C. is to avoid an excess cooling which provides a poor formability during the formation of the cheese to produce cracks and creases in the formed cheese product. An extraordinary cooling produces further disadvantage of permitting the cheese to return, after finishing the forming process, to the previous shape obtained by the cutting process.

Prior to the forming step, the outer surface of the cheese which has been cooled to a temperature of about 45° C. to 35° C. by the above-mentioned cooling step is then subjected to heating. This heating step is the primary step of the present invention, wherein the surface area of the cheese (i.e., a portion extending in the radial direction from the surface of the cheese to the thickness of ⅛ to 1/6 of the cheese diameter) is heated up to a temperature which is about 4° C. to 7° C. greater than that of the central portion of the cheese maintained at a temperature of about 45° C. to 35° C. so as to facilitate the shaping of the cheese. Consequently, there appears the temperature distribution wherein the temperature of the surface area having a predetermined thickness is greater than that of the central portion by a predetermined quantity.

The above-mentioned requirement that the temperature of the surface area should be slightly increased than that of the central portion so as to improve the formability was found after a number of experiments were conducted by the present inventors. The achievement of such requirement permits: (i) the provision of a good workability during the course of the formation of the cheese, (ii) the provision of a smooth surface of the formed cheese product, (iii) the provision of a homogeneous texture of the cheese product and (iv) the elimination of the change in the shape of the cheese with time lapse.

In the above-mentioned steps according to the present invention, the small thermal conductivity of the cheese as well as the temperature characteristics of both the formability and the self-shape-sustaining characteristic are considered to provide a desired temperature distribution in the cheese preferable for carrying out the forming step thus, forming the snack-sized pieces of the cheese product into a desirable, rounded shape is successively performed with high speed by continuously rolling the pieces within the mold die that is used for rounded purposes.

Succeeding to the above-mentioned steps, cutting and forming steps are carried out as will be noted in the following explanation.

With reference to the attached drawing, further detailed explanation of the present invention will be given.

The attached drawing is a schematic illustration showing a preferred embodiment according to the present invention.

A cheese is charged into an emulsification kettle 2 and is heated to obtain a molten cheese therein. There is no specific limiteation regarding the kind of the cheese to be used and melted. By way of example, the cheese composition used for the embodiment are: about 80% of Gouda cheese, about 20% of Cheddar cheese, 2% of Hexametaphosphate, and 0.6% of neutralizer. This mixture is emulsified under a condition that the moisture content becomes about 45%. The cheese is then heated above 80° C. in the emulsifying kettle 2 to convert into a molten form. The molten cheese is supplied through a conduit (not shown) to a scraped double-tube type heat exchange device 4 having a heat exchange function so that the molten cheese is cooled to a temperature of about 37° C. in which any change in the shape of the cheese does not occur in this embodiment.

The cheese designated by a reference numeral 5 which has been cooled to about 37° C. is pressed into an extruding nozzle 6, thereby being formed into a cheese 7 having a diameter of 20 mm.

Thereafter, the cheese 7 generally formed into circular shape in section is caused to direct to a heating device 8 in which the outer surface of the cheese is subjected to heating. Since the temperature of the central portion of the cheese is maintained at about 37° C. in this embodiment, the surface area of the cheese is heated up to about 42° C. In case of insufficient heating, there appears creases and/or cracks on the surface of the cheese to make the formability thereof poor and the formation of the cheese into a desired shape impossible. Contrary to this, excessive heating provides excess fluidity which produces difficulty in carrying out a suitable formation of the cheese. Hot water maintained at about 45° C. is circulated through a jacket of the heating device 8 for conducting the heating step according to the preferred embodiment.

Then, the thus heated cheese is extruded into an ambient air by 15 mm in length by using a quantity cutter 10 or other devices to obtain cheese pieces 11. Preferably, the length of the pieces 11 is 0.6 to 1.5 times as long as the size of the cross-section of the cheese. Each of the cheese pieces 11 about 5 grams in weight.

Thereafter, in a forming device 12, the cheese piece 11 is formed into, as a whole, a desirable rounded shape.

Referring to the drawing, the forming device 12 comprises a belt 21 and a roller 22 having a groove of semi-circular shape in section to form the cheese piece 11 into a ball 13 during the time the piece 11 rolls to move. To obtain a desirable shape of the cheese piece 11 such as spherical, ellipsoidal and barrel-shaped, the shape of the molding groove of the forming device 12 may be changed accordingly.

In the present invention, the temperature of the central portion of the cheese piece 11 is maintained at about 37° C. capable of maintaining the shape of the cheese with the passage of time, while the temperature of the surface area extending in the radial direction on the surface of the cheese to a thickness of 1/7 of the cheese diameter is maintained at about 42° C. which provides a suitable formability. Consequently, the formation of the cheese can be performed without causing any creases and cracks, thereby allowing the provision of the cheese with a uniform texture and a smooth surface. The thus-formed cheese 13 is then rapidly cooled by heat dissipation from the outer surface thereof.

In this embodiment, the cheese 13 formed in the forming device 12 is directed to a transporting chute 14 provided with inclined grooves and located after the forming device 12. As rolling along the groove 15 of the chute 14, the cheese 13 is subjected to cooling. Although the cheese may be naturally cooled at that time, a cooling tunnel may be provided at the chute 14 to enhance the cooling speed, if necessary. This construction in accordance with the preferred embodiment, intended to maintain the temperature of the central portion of the cheese within the temperature zone preventing the shape deformation, allows the formation of the cheese during a short time period possible inspite of the small thermal conductivity of the cheese, thereby stabilizing the shape of the formed cheese.

After being cooled below about 10° C. in order to avoid the deformation due to the handling in the following steps, the cheese product is wrapped by a wrapping machine 18.

What is claimed is:

1. A method of producing a cheese product in snack-sized form from molten cheese, said method comprising the steps of:

cooling the molten cheese to a temperature of about 45° C. to 35° C. in accordance with a moisture content of the molten cheese ranging from about 40% to 50%;

heating the surface area of the cooled cheese to a temperature of about 52° C. to 39° C. while maintaining the central portion of the cooled cheese at a temperature of about 45° C. to 35° C.;

cutting the heated cheese into snack-sized pieces;

and forming each of the snack-sized pieces of continuously rolling them within a mold die for forming them into a rounded shape without corners, said method being characterized in that the surface area extending in the radial direction from the surface of the cheese to a thickness of $\frac{1}{8}$ to 1/6 of the cheese diameter is heated to a temperature of about 52° C. to 39° C. wherein the snack-sized pieces are formed by the continuous rolling within a mold die and provides a uniformed texture and/or a smooth surface and a desirable, rounded shape that is in accordance with a shape of the cross section of the mold, said snack-sized pieces being formed without creases, cracks and/or voids on the surface thereof.

2. A method as set forth in claim 1 further comprising the step of:

rolling the cheese formed into snack-sized rounded pieces along an inclined groove that is provided in a transporting chute, the cross-sectional shape of the groove being adapted to shape the snack-sized pieces of cheese whereby cheese is cooled without causing deformation thereof.

* * * * *